United States Patent
Kuehnel

(10) Patent No.: US 7,107,299 B2
(45) Date of Patent: Sep. 12, 2006

(54) METHOD AND APPARATUS FOR MANAGING LARGE NUMBERS OF OBJECTS HAVING THE SAME PROPERTY

(75) Inventor: Andreas H. Kuehnel, Hollis, NH (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 360 days.

(21) Appl. No.: 09/929,147

(22) Filed: Aug. 14, 2001

(65) Prior Publication Data

US 2003/0037060 A1 Feb. 20, 2003

(51) Int. Cl.
*G06F 17/30* (2006.01)

(52) U.S. Cl. .................. 707/205; 707/100; 707/102; 707/206; 707/103 R

(58) Field of Classification Search ............. 707/206, 707/205, 2, 3, 101, 100, 200, 204, 102, 103 R; 211/114–116; 711/4
See application file for complete search history.

(56) References Cited

U.S. PATENT DOCUMENTS

| | | | | |
|---|---|---|---|---|
| 5,630,093 A | * | 5/1997 | Holzhammer et al. | 711/115 |
| 5,715,455 A | * | 2/1998 | Macon, Jr. et al. | 707/206 |
| 5,717,912 A | * | 2/1998 | Millett et al. | 707/3 |
| 5,732,402 A | * | 3/1998 | Lehman | 707/205 |
| 5,913,217 A | * | 6/1999 | Alger et al. | 707/101 |
| 5,966,703 A | * | 10/1999 | Burrows | 707/2 |
| 6,023,744 A | * | 2/2000 | Shoroff et al. | 711/4 |
| 6,092,071 A | * | 7/2000 | Bolan et al. | 707/101 |
| 6,253,300 B1 | * | 6/2001 | Lawrence et al. | 711/173 |
| 6,256,282 B1 | * | 7/2001 | Yamagami | 369/111 |
| 6,334,134 B1 | * | 12/2001 | Haderle et al. | 707/205 |
| 6,658,437 B1 | * | 12/2003 | Lehman | 707/205 |
| 6,665,779 B1 | * | 12/2003 | Polfer et al. | 711/162 |

* cited by examiner

*Primary Examiner*—Cam-Y Truong

(57) ABSTRACT

The invention is an apparatus and method for managing large numbers of objects having the same property. In various aspects the invention includes an apparatus for use in managing objects, an apparatus for use in managing slots in a page or swap file, and a method for managing a plurality of clustered objects in a container. In still other aspects, the invention includes a computer-readable, program storage medium encoded with instructions that, when performed by a computer, perform such a method and a computer programmed to perform such a method. In one particular embodiment, the invention employs: an allocation bitmap to indicate the state (i.e., in use or free) of various slots in a swap file, a directory bitmap indicating the state of clusters of the slots so that the operating system can quickly locate and allocate slots in the swap file (or files) during a swap, Data structures containing usage counters that indicate how many groups of certain sizes of clusters of free slots can be found in the file, and Lists linking structures for files with compatible usage characteristics.

37 Claims, 4 Drawing Sheets

METHOD AND APPARATUS FOR MANAGING LARGE NUMBERS OF OBJECTS HAVING THE SAME PROPERTY

BACKGROUND OF THE INVENTION

1. Field of the Invention

The present invention pertains to digital computing devices, and, more particularly, to a method and apparatus for managing objects having the same property.

2. Description of the Related Art

The size and complexity of modern day computing systems on the high end of the technology have exploded in recent years. As the technology matures, ever larger numbers of digital computing devices are handling ever larger amounts of data. Large scale "enterprise computing systems" can comprise tens of thousands of machines. Indeed, the Internet comprises millions of machines handling untold amounts of data. The complexity of computing systems has increased concomitantly to accommodate the data demands from so many users across so many machines in a reasonably timely fashion.

One key component in the operation of a computing system is the "operating system" (or "OS"). A general treatment of operating systems can be found in *The Computer Science and Engineering Handbook*, pp. 1647–1664 (Allen B. Tucker, Jr., ed. CRC Press 1997) (ISBN 0-8493-2909-4). The operating system generally controls the operation of a computing device, providing an interface between the computing device's hardware and the applications programs, e.g., word processing, spreadsheet, and e-mail software, employed by the computing device's users.

An operating system typically strives to meet at least three goals: hiding details of the hardware by creating abstractions for use by applications programs, managing computing resources (e.g., memory, processor time, input/output peripherals), and providing an effective user interface. On a personal computer level, this generally includes performing basic tasks like recognizing user input (e.g., information typed on the keyboard), transmitting output to the display, managing files and directories in the computer's disk storage, and controlling peripheral devices. On larger scale computing systems, the operating system may assume greater responsibilities like security (e.g., excluding unauthorized users) and ensuring the various users do not interfere with each other or corrupt resources common to all users.

One typical responsibility of an operating system is the management of memory. The memory system of a computing device may be categorized into disk storage (e.g., a hard disk), main memory (e.g., the random access memory, or "RAM"), and cache. Data is typically stored long term on disk storage, but it takes a relatively long time to read from or write to disk storage. If the operating system anticipates using certain data stored in disk storage, or if an application actually needs data stored in disk storage, the operating system will move it out of disk storage into main memory. Main memory is only a temporary storage, but is much quicker to read from and write to than is disk storage. Data may also be stored in cache, which is the most temporary and quickest form of memory.

One common aspect of memory management is the use of "virtual memory," as opposed to "physical memory." Virtual memory is an abstraction of the operating system used by application programs. The main memory has a finite number of physical addresses at which data can be stored, and is called "physical memory" in this context. However, the operating system allows applications to use a memory space that is much larger than the physical memory. This larger address space is referred to as "virtual." The operating system maintains data structures known as a "page tables" that map virtual addresses into physical addresses and onto disk storage.

When the application writes to or reads from a virtual address, the system hardware and/or the operating system consult the page tables and translate that virtual address into a physical address. If the data is not currently in physical memory, it is read from disk—transparently to the application—and stored in physical memory. Likewise, when the operating system notices that free physical memory is getting scarce, application data is transparently written to disk storage and the associated memory is freed. This process is called "paging." When the operating system notices that memory is so scarce that paging of individual pages is insufficient, or if application processes were inactive for a long time, it becomes more efficient to remove the whole application process from the system environment. This process is called "swapping."

The actual swapping and paging in a virtual memory system is handled by a component of the operating system called the "modified page writer." When a page of modified data needs to be written to the page file (i.e., swapped or paged to disk storage) the modified page writer quickly finds the appropriate page file in disk storage and a slot (i.e., free clusters) in the page file. With possibly hundreds of files to select from and millions of slots in each file, this becomes a difficult and/or time-consuming problem. The problem worsens when a large collection of pages needs to be saved, for example when a process is swapped with a large, non-compressible working set. In this case, it is not sufficient just to know that free slots exist in a given file. The data may have to be spread across several files and it is time consuming to find the most suitable files. In today's environments where terabyte sized databases and large memory systems are routinely encountered, the problems are exacerbated.

One particular operating system is the Open Virtual Memory System ("OpenVMS"). For several years, Open-VMS allowed users to create and use huge virtual address spaces, but the design still limited page file sections to a theoretical maximum of 32 Gb per process (each process could use at most 4 page files at 8 Gb) and 504 Gb total per system (63 page files at 8 Gb). While page files of this size were not common, the actually achievable/working limits for a single process, when taking into account page file use for page tables and page file use by other processes, were lower than 32 Gb. This limit was uncomfortably close to the supported maximum of physical memory on a system. Many 64-bit users often want to be able to use an amount of dynamic virtual memory larger than the amount of physical memory available on the system.

While page file sections are not the only method to access process virtual memory, they are convenient. Other methods available in OpenVMS include file based sections, PFN sections and the resident memory sections. Memory resident sections in particular are believed to become a favorite method for large memory systems. However, it is still highly desirable that OpenVMS does not impose any specific memory access methods on users. It is therefore desirable to raise page file related limits at least to an order of magnitude above physical memory limits. Ideally, a solution to this problem should support very large page and swap files each capable of holding millions of pages; support many concurrently active page and swap files; fully populate page and swap files (i.e., the allocation technique should allow to find any free page); locate clusters of adjacent free pages; use a minimum amount of fixed physical memory for data structures; and be fast.

The present invention is directed to resolving, or at least reducing, one or all of the problems mentioned above.

SUMMARY OF THE INVENTION

The invention is an apparatus and method for managing large numbers of objects having the same property.

In a first aspect, the invention includes an apparatus for use in managing objects. The apparatus comprises a plurality of containers; a plurality of clusters populating the container, each cluster comprising a plurality of objects; a first data structure indicating a state of the objects; and a second data structure indicating the state of the clusters.

In a second aspect, the invention includes an apparatus for use in managing slots in a plurality of swap or page files. The apparatus comprises, in this aspect, a plurality of files; a plurality of clusters populating the files, each cluster comprising a plurality of slots; an allocation bitmap for each file indicating a state of the slots; and a directory bitmap for each allocation bitmap indicating the state of the clusters.

In a third aspect, the invention includes a method for managing a plurality of clustered objects in a container. The method comprises tracking a state for each of a plurality of objects populating a container in a first data structure; tracking a state for cluster of the objects in a second data structure; and consulting at least one of the first and second data structures to manage the objects.

In a fourth aspect, the invention includes a method for managing a plurality of clustered slots in a page file or a swap file. The method comprises tracking a state for each of a plurality of slots populating a page file in a allocation data structure; tracking a state for cluster of the memory like objects in a directory data structure; and consulting at least one of the first and directory data structures to manage the slots.

In still other aspects, the invention includes a computer-readable, program storage medium encoded with instructions that, when performed by a computer, perform one of the methods and a computer programmed to perform one of the methods.

BRIEF DESCRIPTION OF THE DRAWINGS

The invention may be understood by reference to the following description taken in conjunction with the accompanying drawings, in which like reference numerals identify like elements, and in which.

Figure 1:
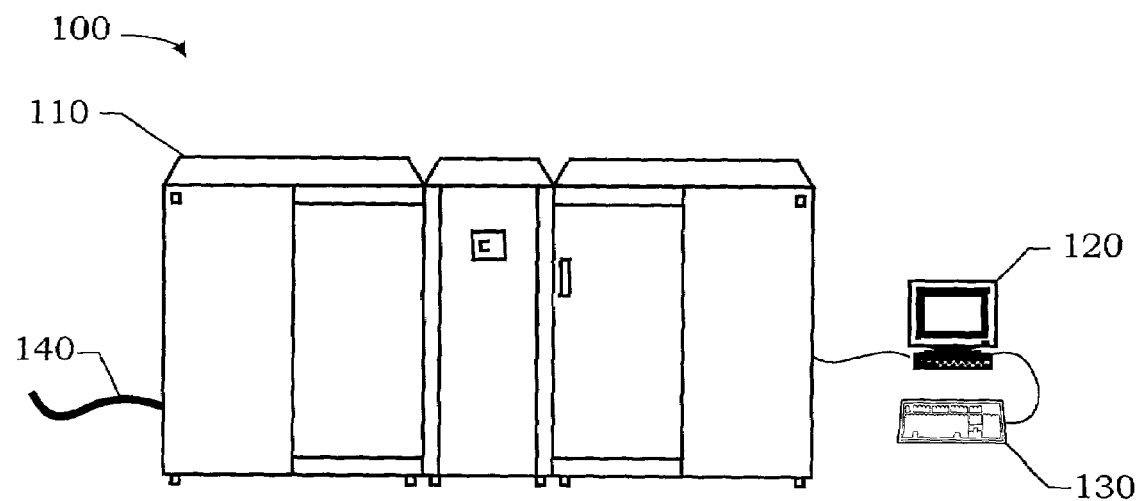
FIG. 1 depicts an electronic computing device programmed and operable in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort, even if complex and time-consuming, would be a routine undertaking for those of ordinary skill in the art having the benefit of this disclosure.

Turning now to the drawings, FIG. 1 illustrates an electronic computing device 100 constructed and operated in accordance with the present invention. The computing device 100 is, in the illustrated embodiment, a server. Various embodiments may employ various types of computing devices including, but not limited to, personal computers, workstations, mini-computers, and mainframe computers. The computing device 100 includes a server unit 110, a monitor 120, a keyboard 130. A user can interface with the computing device 100 via the monitor 120 and keyboard 130. The computing device 100 will also typically be connected to a larger computing system (not shown), over the network connection 140. The larger computer system may be a local area network ("LAN"), a wide area network ("WAN"), an "intranet," an enterprise computing system, or even the Internet. However, the invention is not so limited and may be practiced on a stand-alone computing device.

The computing device 100 in the illustrated embodiment utilizes one or more Alpha® processors commercially available from Compaq Computer Corporation. Alternative embodiments, however, may employ computing devices based on other processors. Exemplary alternative processors include, but are not limited to, Intel's Pentium® family of processors, Intel's IA64 class of processors, Hewlett-Packard's IA64 class of processors, and Advanced Micro Device's K7®, Athlon®, and Duron® processors. The processor around which the computing device 100 is built is not material to the practice of the invention provided it is capable of supporting an operating system with which the present invention may be implemented, as is discussed further below. However, processors having longer word lengths will generally be better able to exploit the advantages inhering from the present invention.

Figure 2:
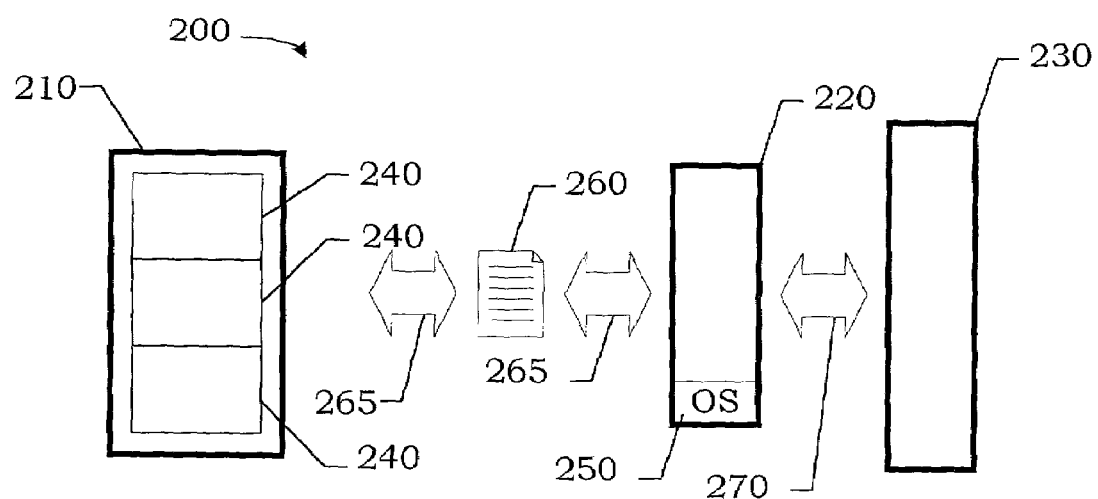
FIG. 2 conceptually illustrates of portion of the memory subsystem of the electronic computing device of FIG. 1.

FIG. 2 conceptually illustrates a portion 200 of the virtual memory subsystem of the computing device 100 in FIG. 1. The portion 200 includes a container 210, such as a page file or a swap file, providing disk storage, a physical memory 220 implemented in RAM, and a virtual memory address space 230. The container 210 includes a plurality of disk blocks 240 implemented in a conventional fashion by an operating system 250 loaded into the physical memory 220. Those skilled in the art having the benefit of this disclosure will appreciate that the memory subsystem will include additional components not shown, e.g., a memory controller.

These and other details of the memory subsystem are not shown for the sake of clarity so as not to obscure the invention.

The operating system 250 is shown residing in the physical memory 220, into which it is loaded for execution when the computing device 100 powers up. Note that, as mentioned above, virtual memory is an abstraction of the operating system. Thus, the operating system 250 may be any operating system that utilizes a virtual memory address space. In the illustrated embodiment, the operating system is an Open Virtual Memory System ("OpenVMS") operating system. Although the present invention is disclosed in the context of the OpenVMS operating system, the invention is not so limited. Alternative embodiments might implement a UNIX-based operating system. Other alternative embodiments might employ still other operating systems. Furthermore, the invention is not limited to virtual memory operating systems. Not all operating systems employ this abstraction (e.g. the disk operating system, or "DOS"). Still further, the invention may be used to manage objects that are not related to memory at all, as long as all objects have like properties and managing the objects means to find objects of one state and assign another state. Examples might include managing blocks of telephone numbers or storage space in an automated warehouse.

Still referring to FIG. 2, pages 260 of data are paged or swapped between the disk storage in the container 210 and the physical memory (i.e., "main memory") 220 as represented by the arrows 265 in a manner described more fully below. In the illustrated embodiment, each page 260 contains 8 Kb of data, but other page sizes may be used in alternative embodiments. The physical memory 220 is mapped into the virtual address space 230 as represented by the arrow 270 in any suitable manner known to the art. Again, the virtual address space 230 is an abstraction of the OS 250 from the physical memory 220. The virtual address space 230 may also be implemented in any suitable manner known to the art.

Figure 3:
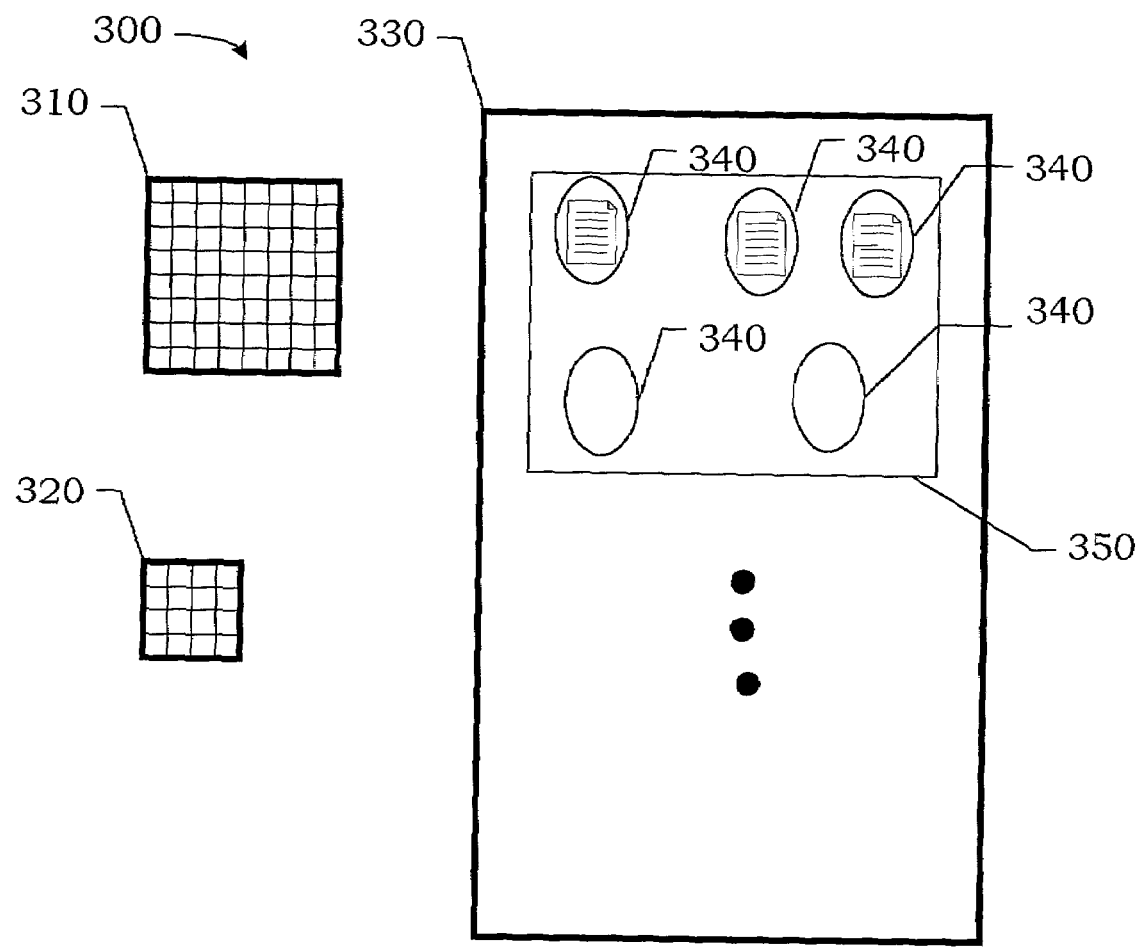
FIG. 3 conceptually illustrates a plurality of data structures employed in accordance with the present invention.

FIG. 3 illustrates a set 300 of data structures employed in accordance with the present invention. The set 300 includes a first data structure 310, a second data structure 320, and a container 330. The first data structure 310 and the second data structure 320 are, in the illustrated embodiment, bit maps. However, alternative embodiments may employ alternative data structures. The container 330 is, in the illustrated embodiment, a page file, or a swap file. The container 330 comprises a plurality of objects 340, which, in the illustrated embodiment, are "slots" in the page file. Each object 340 is capable of holding data, one page at a time in the illustrated embodiment. In one particular implementation, each of up to 254 containers 330 may hold up to 16 million objects 340. It is these objects 340 that are managed.

The state of each object 340 in the container 330 is "free" or "in use," depending on whether the object 340 is actually storing data. Note that in FIG. 3, some of the objects 340 are free, and some are in use. The first data structure 310 includes a one-bit flag for each object 340 that is set (or cleared) when the object 340 is in use, and cleared (or set) when the object 340 is free. Thus, the first data structure 310 indicates the allocation of each object 340 and may be referred to as the "allocation" data structure. Thus, as data is allocated into the container 330, the first data structure 310 can be consulted to determine which of the objects 340 are free for that purpose.

However, since the container 330 may contain millions, or even billions, of objects 340 in some embodiments, the first data structure 310 includes millions, or even billions, of bits in these embodiments. This size is too large to scan on a regular basis to quickly and efficiently determine which objects 340 are free for storage for most embodiments. This is especially true since the implementation of most embodiments will call for writing more than a single page of data for each I/O request, sometimes 64 or more pages per I/O request, where multiple pages are stored in adjacent objects 340. "Adjacent" means, in this context, that the objects have contiguous addresses on disk. Thus, for any given I/O request, as many as 64 adjacent, free objects 340 may need to be quickly and efficiently located.

The second data structure 320 is used to quickly locate adjacent, or "clustered," free objects 340. In some implementations, this second data structure 320 is referred to as a "directory" data structure. The second data structure 320 includes one bit for every predetermined number of adjacent objects 340. The predetermined number of adjacent objects 340 is referred to as the "cluster size" and the adjacent objects 340 are referred to as "clustered," or a "cluster." In one particular embodiment, the cluster size is 16, and every sixteen adjacent objects 340 constitute a cluster.

The second data structure 320 includes one bit for each cluster 350 of adjacent objects 340 in the container 330. If any one of the objects 340 within a given cluster 350 is in use, as reflected by the first data structure 110, then a bit corresponding to that cluster 350 is cleared (or set) to indicate that the cluster 350 is in use. Conversely, if all the objects 340 within a given cluster 350 are free, the bit is then set (or cleared) to indicate that the cluster 350 is free. Thus, the OS 250 can locate free storage much more quickly. In an implementation where the cluster size is sixteen, the second data structure 320 is only $\frac{1}{16}$ of the size of the first data structure 310, and the OS can scan the second data structure 320 sixteen times faster than the first data structure 310. This allows the OS 250 to quickly locate sufficiently large clusters of free objects 340. In a different implementation, a bit in the data structure 320 may be set (or cleared) if any object 340 within a given cluster 350 is free (or in use). Such an implementation allows to quickly locate any free (or in use) object within a vast number of objects.

The second data structure 320 is typically scanned in increments greater than one. These increments are typically equal to the "wordlength" of the server 100. The wordlength is the maximum number of bits that may be stored in or handled by the individual registers of the processor(s) (not shown) on which the OS 250 is executing at any given time. In turn, bits processed in groups equivalent to the wordlength are referred to as "words." Thus, the wordlength will be implementation specific. For instance, the Compaq Computer Corporation's Alpha™ processor, the IA64 class processors from Intel and Hewlett-Packard, and Advanced Micro Devices' Athlon™ and Duron™ processors have 64 bit registers, ie., can handle data 64 bits at a time. So, their wordlength is 64 and their words are 64 bits long. However, Intel's Pentium® class processors and Advanced Micro Device's K6® processor handle data 32 bits at a time. Their wordlength is 32 and their words are 32 bits long. Thus, the second data structure 320 is scanned one word at a time, whatever the length of that word may be.

Consider again an implementation in which the cluster size is 16, the wordlength is 64, and in which 64 pages of data are swapped per I/O request. The OS 250 will need to locate four clusters 350 of objects 340 to complete this I/O request, and these four clusters 350 should be adjacent. Thus, the OS 250 can scan the second data structure 320 in increments of 64 (i.e., one word at a time) for free clusters 350. On Alpha servers, this 64 bit increment is referred to as a "quadword" for historical reasons. However, this aspect of the invention will be implementation specific depending on the cluster size and the number of pages handled per I/O request. Note that each quadword of the data structure 320 contains 64 bits, each of which represents the state of a cluster of 16 bits in the data structure 310. Each quadword of the data structure 320 therefore indicates if the operating system is guaranteed to find 16 adjacent free pages within a span of 16*64=1024 pages of the page or swap file.

Some operating systems employ only a single swap file, or container 330, but any number of containers 330 may be used. In embodiments employing multiple containers 330, each container 330 has a corresponding first data structure 310 and a corresponding second data structure 320 as discussed above. In these embodiments, it may be advantageous to employ one or more "usage counters." Usage counters provide certain information regarding the usage of the clusters in a given container 330. For instance, a usage counter may be used to indicate the number of free clusters 350 in a container 330, so that the operating system 250 can skip scanning data structures 320 and/or 310 for a container 330 whose usage counter indicates has an insufficient number of free clusters 350. The usage counters can be located in one or more data structures in a part of the memory used by the OS 250. For the OpenVMS operating system, this memory area is called the "non-paged pool" 400, shown in FIG. 4, which is a kind of a heap storage for privileged code of the OS 250.

Figure 4:
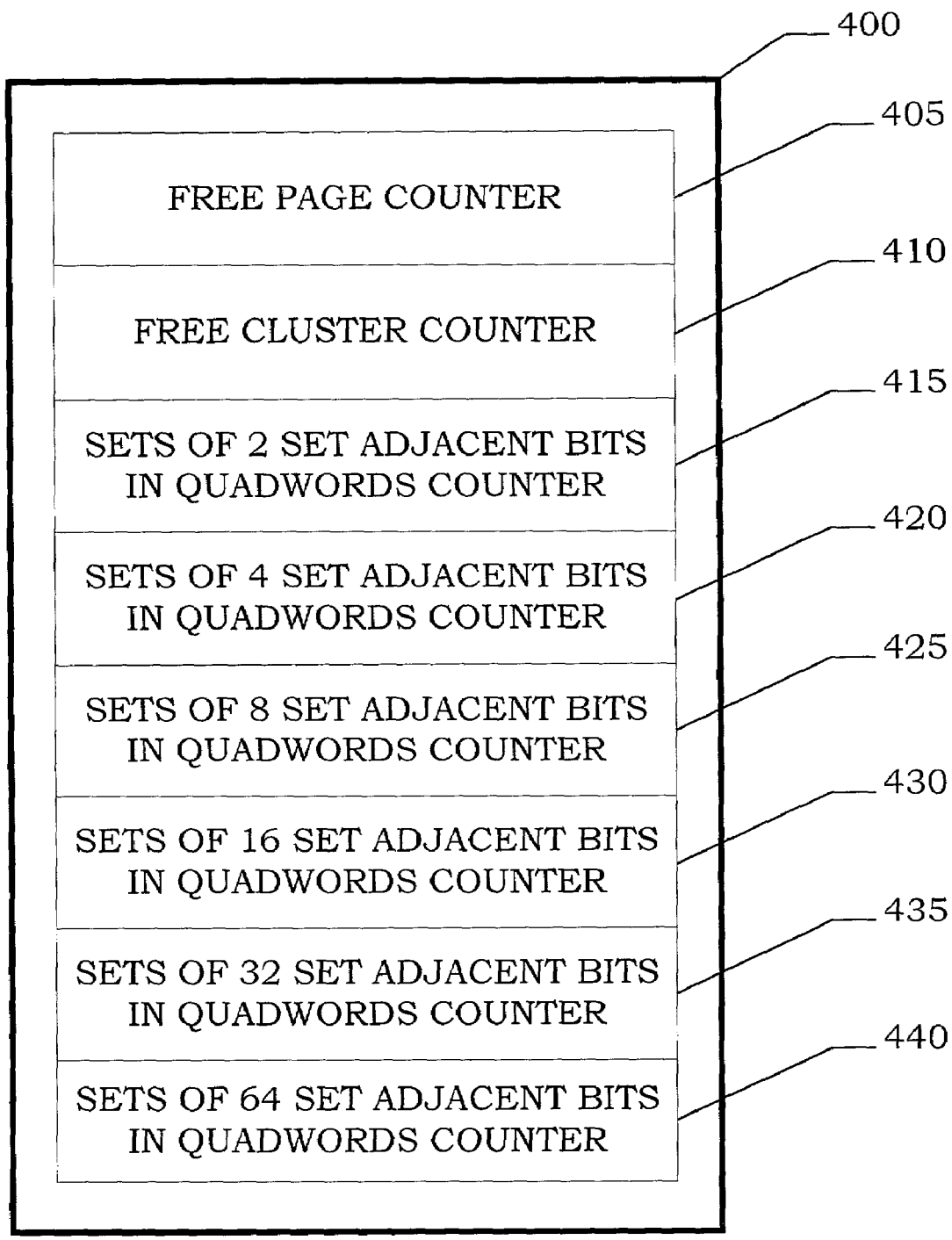
FIG. 4 conceptually illustrates a number of usage counters employed in one particular implementation of one particular embodiment.

One particular embodiment of the present invention utilizes the following usage counters, all shown in FIG. 4, for each container 330:
 a counter 405 of how many free pages it has (bits set in allocation bitmap 310);
 a counter 410 of how many free clusters is has (bits set in directory bitmap 320);
 a counter 415 of how many sets of 2 adjacent bits are set in words of the directory bitmap;
 a counter 420 of how many sets of 4 adjacent bits are set in the words of the directory bitmap;
 a counter 425 of how many sets of 8 adjacent bits are set in the words of the directory bitmap;
 a counter 430 of how many sets of 16 adjacent bits are set in the words of the directory bitmap;
 a counter 435 of how many sets of 32 adjacent bits are set in the words of the directory bitmap; and
 a counter 440 of how many sets of 64 adjacent bits are set in the words of the directory bitmap.

A quick inspection of these counters permits the OS 250 to quickly select the container 330 which is most appropriate to satisfy a need for a multitude of contiguous free objects 340. Note that even in an implementation employing usage counters, not all the above usage counters must be employed. Furthermore, additional or different usage counters may be used in alternative implementations.

While maintaining these counters may appear to be a lot of overhead, the performance impact is really very modest. For example, in order to determine if a given word contains any two adjacent set bits, the word content is shifted by one position and a logical AND operation is applied between the original and the shifted data. If the result is non-zero, the word contains at least two adjacent set bits. The process is repeated to check for groups of 4, 8, 16, 32, 64 adjacent bits.

Figure 5:
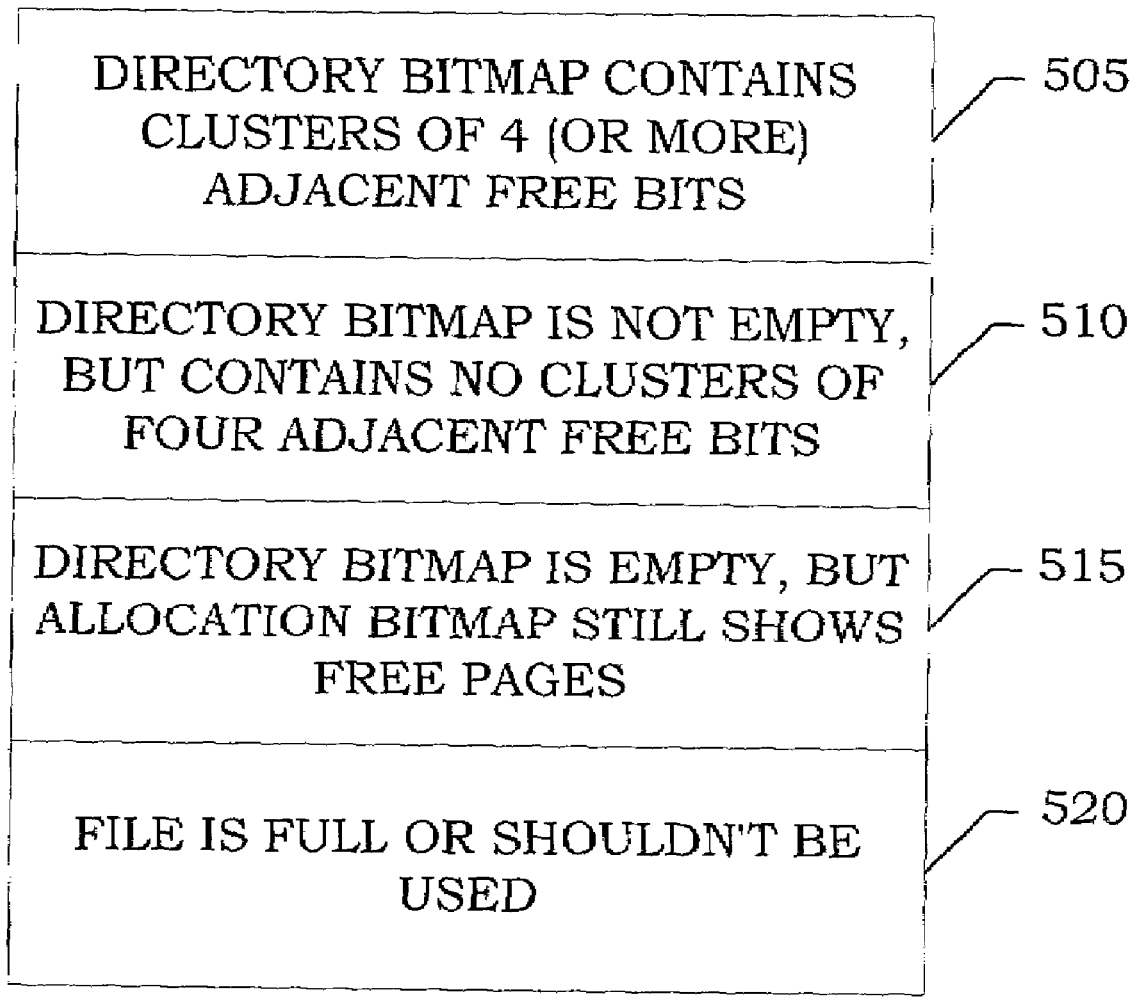
FIG. 5 conceptually illustrates a plurality of lists containing information extracted from the usage counters of FIG. 4.

The power of the usage counters can be leveraged by maintaining lists of information drawn from the counters. For instance, one implementation employs the following lists, shown in FIG. 5:

a list 505, the directory bitmap contains clusters of 4 (or more) adjacent free bits;
 a list 510, the directory bitmap is not empty, but contains no clusters of four adjacent free bits;
 a list 515, the directory bitmap is empty, but allocation bitmap still shows free pages; and
 a list 520, the file is full or shouldn't be used (to be removed from the system).

Note that (1) these lists can also be linked to the first and second data structures 310, 320, and (2) that data structures other than lists may be used to store this information.

Again, even in implementations employing such lists, not necessarily all of these lists have to be used and while other lists may be used. For example, in an environment where pages 340 should be clustered for writing in order to minimize the driver overhead associated with each I/O, and where the optimum I/O size would write 64 pages at a time, the operating system will attempt to locate 4 adjacent clusters 350 of pages 340. If, however, no 4 adjacent clusters of free pages can be found, it would still be advantageous to write somewhat smaller clusters or even any pages at all.

The lists 505, 510, 515, 520 can be employed in a circular fashion to evenly distribute page write I/O requests across available containers 330. That is:
 take the next file indicated as available from list 505;
 if list 505 is empty, take the next file indicated as available from list 510
 if list 510 is empty, take the next file indicated as available from list 515; and
 if list 515 is empty, all containers 330 are full and the request is rejected.

The lists 505, 510, 515, 520 may also be employed in other ways.

Some performance gains can be realized by manipulating the performance of I/O requests. It helps if the preferred number of pages to write is in most cases not an absolute must. Fewer pages can be written using more I/Os, but, up to a certain point, writing more pages is more efficient. For example, in one implementation, the operating system 250 prefers to write pages in clusters of 64 pages, because this reduces the overhead associated with initiating I/O if many pages must be written. But, it is more important that pages are written at all in order to free up physical memory. Since the available free space may become fragmented over time, there may not be any clusters of 64 adjacent pages available. In that case, it is sufficient if a smaller number of pages is written per request thus using the limited free space.

However, sometimes it is desirable to write out all pages of a given process and move the whole process out to disk. If the process locked a large number of pages, it may have to find a lot of space in the swap file. This swap space does not have to be contiguous, however, it should also not be overly fragmented in order to avoid very large or varying size control data necessary to record where the process memory can be found. OpenVMS for example allows the process outswap to use up to 64 fragments each of which can be located in a different page or swap file. The usage pointers allow quick location of which files have enough space. In theory, this would allow to swap a process with up to 64*64*16=65536 pages, although, as a practical matter, this would take longer than would be permitted by the performance constraints of most implementations.

Note that some portions of the detailed descriptions herein are presented in terms of a software implemented process involving symbolic representations of operations on data bits within a computer memory. These descriptions and representations are the means used by those in the art to most effectively convey the substance of their work to others skilled in the art. The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantifies. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. An apparatus for use in managing objects, the apparatus comprising:
    a plurality of clusters, each cluster comprising a plurality of objects;
    memory storing a first data structure indicating a state of the objects;
    said memory storing a second data structure indicating the state of the clusters;
    a counter indicative of a number of sets of adjacent bits that are set in words of the second data structure, wherein a second data structure bit being set indicates that one or more clusters of objects associated with said bit are free for storage of data, and wherein each word comprises a plurality of bits;
    said memory further storing at least one data structure containing information extracted from the counter to manage the objects; and
    said at least one data structure containing information indicating that:
    the second data structure contains clusters of at least four adjacent free bits;
    the second data structure is not empty, but contains no clusters of four adjacent free bits; or
    the second data structure is empty, but allocation bitmap still shows free pages;
    wherein said apparatus indicates a cluster of objects is free if a bit is set and said cluster of objects is not free if the bit is cleared.

2. The apparatus of claim 1, further comprising a plurality of containers populated by the clusters and control data associated with the containers.

3. The apparatus of claim 1, further comprising a plurality of containers populated by the clusters and wherein at least some containers comprise files.

4. The apparatus of claim 3, wherein the file is a page file or a swap file.

5. The apparatus of claim 3, wherein the objects comprise slots in the file.

6. The apparatus of claim 1, wherein each cluster comprises 16 objects.

7. The apparatus of claim 1, wherein at least one of the first and second data structures comprises a bitmap.

8. The apparatus of claim 1, further comprising at least one other counter selected from the group consisting of;
    a counter of how many free pages a cluster has; and
    a counter of how many free clusters are in the container.

9. The apparatus of claim 1 wherein the number of sets of adjacent bits is selected from the group consisting of 2, 4, 8, 16, 32, and 64.

10. An apparatus for use in managing clusters, the apparatus comprising:
    a plurality of files;
    a plurality of clusters populating each file, each cluster comprising a plurality of slots;
    memory storing an allocation bitmap indicating a state of the slots;
    said memory storing a directory bitmap indicating the state of the clusters;
    a usage counter indicative of a number of sets of adjacent bits that are set in words of the directory bitmap, a bit in the directory bitmap being set to indicate whether a cluster associated with said bit is free, wherein each word comprises a plurality of bits; and
    at least one data structure containing information indicating that:
    the directory bitmap contains clusters of at least four adjacent free bits;
    the directory bitmap is not empty, but contains no clusters of four adjacent free bits; or
    the directory bitmap is empty, but the allocation bitmap still shows free pages;
    wherein said apparatus indicates a cluster of objects is free if a bit in the directory bitmap is set and said cluster of objects is not free if the bit is cleared.

11. The apparatus of claim 10, wherein each file is a page file or a swap file.

12. The apparatus of claim 10, wherein each cluster comprises 16 slots.

13. The apparatus of claim 10, further comprising at least one other usage counter selected from the group consisting of:
    a counter of how many free slots a cluster has; and
    a counter of how many free clusters are in the file.

14. A computer implemented method for managing a plurality of clustered objects, the method comprising:
    tracking a state for each of a plurality of objects in a first data structure;
    tracking states of clusters of object in a second data structure;
    consulting at least one of the first and second data structures to manage objects;
    consulting at least one usage counter to manage the objects, the at least one usage counter indicates how many sets of adjacent bits are set in words of the second data structure, wherein each word comprises a plurality of bits associated with an implementation specific wordlength;

adjusting a bit in the second data structure being set to indicate whether a cluster of objects associated with said bit is free or in use;

indicating a cluster of objects is free if the bit is set or in use if the bit is cleared; consulting at least one list containing information extracted from usage counters to manage the objects;

managing the objects using the extracted information in the at least one list;

wherein consulting the at least one list includes consulting a list selected from a group consisting of:

a first containing information indicating whether the second data structure contains clusters of at least four adjacent free bits;

a second list containing information indicating whether the second data structure is not empty, but contains no clusters of four adjacent free bits; and a third list containing information indicating whether the second data structure is empty, but allocation bitmap still shows free objects.

15. The method of claim 14, further comprising:
constructing the first data structure; and
constructing the second data structure.

16. The method of claim 14, wherein tracking the state for each of the plurality of objects in the first data structure or tracking the states of clusters of objects in the second data structure includes tracking in a bitmap.

17. The method of claim 14, wherein consulting the at least one usage counter includes consulting at least one other usage counter selected from the group consisting of:
a counter of how many free pages a file has; and
a counter of how many free clusters are in the file.

18. A computer-readable program storage medium encoded with instructions that, when executed by a computing device, perform a method for managing a plurality of clustered objects in a container, the method comprising:

tracking a state for each of a plurality of objects populating a container in a first data structure;

setting bits in a second data structure to indicate whether objects associated with each bit are free or in use;

indicating: objects are free if a bit in a bitmap is set and said objects are not free if the bit is cleared;

tracking states of clusters of objects in the second data structure;

consulting at least one of the first and second data structures to manage the objects;

consulting at least one usage counter that indicates how many sets of adjacent bits are set in words of the second data structure to indicate that associated objects are free for storing data; and consulting at least one list containing information extracted from usage counters to manage the objects, wherein each word comprises a plurality of electronic bits, wherein consulting the at least one list in encoded method includes consulting a list selected from a group consisting of:

a first list containing information indicating whether the second data structure contains clusters of at least four adjacent free bits;

a second list containing information indicating whether the second data structure is not empty, but contains no clusters of four adjacent free bits;

and a third list containing information indicating whether the second data structure is empty, but the allocation bitmap still shows free objects.

19. The program storage medium of claim 18, wherein the encoded method further comprises:
constructing the first data structure; and
constructing the second data structure.

20. The program storage medium of claim 18, wherein tracking the state for each of the plurality of objects populating the container in the first data structure or tracking the states of clusters of objects in the second data structure in the encoded method includes tracking in a bitmap.

21. The program storage medium of claim 18, wherein consulting the at least one usage counter in the encoded method includes consulting another usage counter selected from the group consisting of:
a counter of how many free pages a file has; and
a counter of how many free clusters are in the file.

22. A computing device programmed to perform a computer-implemented method for managing a plurality of clustered objects in a container, the method comprising:

tracking a state for each of a plurality of objects populating a container in a first data structure;

setting bits in a second data structure to indicate whether objects associated with each bit are free or in use;

indicating an object is free if a bit in bitmap is set and said object is not free if the bit is cleared;

tracking states of clusters of objects in the second data structure;

consulting at least one of the first and second data structures to manage the objects;

consulting at least one usage counter that indicates how many sets of adjacent bits are set in words of the second data structure, a set bit in the second data structure indicating that an associated cluster of objects is free for storing data, wherein the words each have a wordlength based on a maximum number of bits handled by a processor that executes an operating system; and consulting at least one list containing information extracted from usage counters to manage the objects;

wherein consulting the at least one list in a programmed method includes consulting a list selected from a group consisting of:

a first list containing information indicating whether the second data structure contains clusters of at least four adjacent free bits;

a second list containing information indicating whether the second data structure is not empty, but contains no clusters of four adjacent free bits; and a third list containing information indicating whether the second data structure is empty, but allocation bitmap still shows free objects.

23. The programmed computing device of claim 22, wherein the programmed method further comprises:
constructing the first data structure; and
constricting the second data structure.

24. The programmed computing device of claim 22, wherein tracking the state for each of the plurality of objects populating the container in the first data structure or tracking the states of clusters of objects in the second data structure in the programmed method includes tracking in a bitmap.

25. The programmed computing device of claim 22, wherein consulting the at least one usage counter in the programmed method includes consulting another usage counter selected from the group consisting of:
a counter of how many free pages a file has; and
a counter of how many free clusters are in the file.

26. A computer implemented method for managing a plurality of clustered slots in a file, the method comprising:
tracking a state for each of a plurality of slots populating a file in an allocation data structure;
tracking states of clusters of objects in a directory data structure;
consulting at least one of the allocation and directory data structures to manage the slots;
consulting at least one usage counter that indicates how many sets of adjacent binary bits are set in words of the directory structure thereby indicating which clusters of objects are free for storing data; and
consulting at least one list containing information extracted from usage counters to manage the slots, wherein managing the plurality of clustered slots by consulting the at least one list includes consulting a list selected from a group consisting of:
a first list containing information indicating that the directory data structure for files in this list contains clusters of at least four adjacent free bits;
a second list containing information indicating that the directory data structure for files in this list is not empty, but contains no clusters of four adjacent free bits;
and a third list containing information indicating that the directory data structure for files in this list is empty, but allocation bitmap still shows free slots.

27. The method of claim 26, further comprising:
constructing the allocation data structure; and
constructing the directory data structure.

28. The method of claim 26, wherein tracking the state for each of the plurality of slots populating the file in the allocation data structure or tracking the states of cluster of objects in the directory data structure includes tracking in a bitmap.

29. The method of claim 26, wherein consulting the at least one usage counter includes consulting another usage counter selected from the group consisting of:
a counter of how many free pages a file has; and
a counter of how many free clusters are in the file.

30. A computer-readable program storage medium encoded with instructions that, when executed by a computing device, perform a method for managing a plurality of clustered slots in a file, the method comprising:
tracking a state for each of a plurality of slots populating a file in an allocation data structure;
tracking states of clusters of objects in a directory data structure;
setting bits in at least one of the allocation and directory data structures to indicate whether a corresponding slot is free or in use;
indicating: said corresponding slot is free if a bit of the setting bits is set and said corresponding slot is in use if the bit of the setting bit is cleared;
consulting at least one of the allocation and directory data structures to manage the slots;
consulting at least one usage counter that indicates how many adjacent clusters are available for storing data;
consulting at least one list containing information extracted from usage counters to manage the slots, wherein consulting the at least one list in encoded method includes consulting a list selected from a group consisting of:
a first list containing information indicating whether the directory data structure contains clusters of at least four adjacent free bits;
a second list containing information indicating whether the directory data structure is not empty, but contains no clusters of four adjacent free bits; and
a third list containing information indicating whether the directory data structure is empty, but allocation bitmap still shows free slots.

31. The program storage medium of claim 30, wherein the encoded method further comprises:
constructing the allocation data structure; and
constructing the directory data structure.

32. The program storage medium of claim 30, wherein tracking the state for each of the plurality of slots populating the file in the allocation data structure or tracking the states of clusters of objects in the directory data structure in the encoded method includes tracking in a bitmap.

33. The program storage medium of claim 30, wherein consulting the at least one usage counter in the encoded method includes consulting another usage counter selected from the group consisting of:
a counter of how many free slots a file has; and
a counter of how many free clusters are in the file.

34. A computing device programmed to perform a method for managing a plurality of clustered slots in a file, the method comprising:
a computing device tracking a state for each of a plurality of slots populating a file in a allocation data structure;
the computing device tracking states of clusters of objects in a directory data structure;
the computing device consulting at least one of the allocation and directory data structures to manage the slots and the computing device consulting at least one usage counter that indicates how many sets of adjacent bits are set in words of the directory data structure thereby indicating which clusters are free for storing data; and
the computing device consulting at least one list containing information extracted from usage counters to manage the slots;
wherein the computing device manages the slots by consulting the at least one list in programmed method includes the computing device consulting a list selected from a group consisting of:
a first list containing information indicating whether the directory data structure contains clusters of at least four adjacent free bits;
a second list containing information indicating whether the directory data structure is not empty, but contains no clusters of four adjacent free bits;
and a third list containing information indicating whether the directory data structure is empty, but allocation bitmap still shows free slots.

35. The programmed computing device of claim 34, wherein the programmed method further comprises:
constructing the allocation data structure; and
constructing the directory data structure.

36. The programmed computing device of claim 34, wherein tracking the state for each of the plurality of slots populating the file in the allocation data structure or tracking the states of clusters of objects in the directory data structure in the programmed method includes tracking in a bitmap.

37. The programmed computing device of claim 34, wherein consulting the at least one usage counter in the programmed method includes consulting another usage counter selected from the group consisting of:
a counter of how many free slots a file has; and
a counter of how many free clusters are in the file.

* * * * *

UNITED STATES PATENT AND TRADEMARK OFFICE
CERTIFICATE OF CORRECTION

PATENT NO.         : 7,107,299 B2                                              Page 1 of 1
APPLICATION NO. : 09/929147
DATED              : September 12, 2006
INVENTOR(S)        : Andreas H. Kuehnel It is certified that error appears in the above-identified patent and that said Letters Patent is hereby corrected as shown below:

In column 1, line 12, delete "modem" and insert -- modern --, therefor.

In column 7, line 3, delete "l/O" and insert -- I/O --, therefor.

In column10, line 16, in Claim 8, delete "of;" and insert -- of: --, therefor.

In column 12, line 56, in Claim 23, delete "constricting" and insert -- constructing --, therefor.

Signed and Sealed this

Twentieth Day of January, 2009

JON W. DUDAS
*Director of the United States Patent and Trademark Office*